W. WILKENS.
RAIL SUPPORT.
APPLICATION FILED NOV. 26, 1909.
951,928.
Patented Mar. 15, 1910.
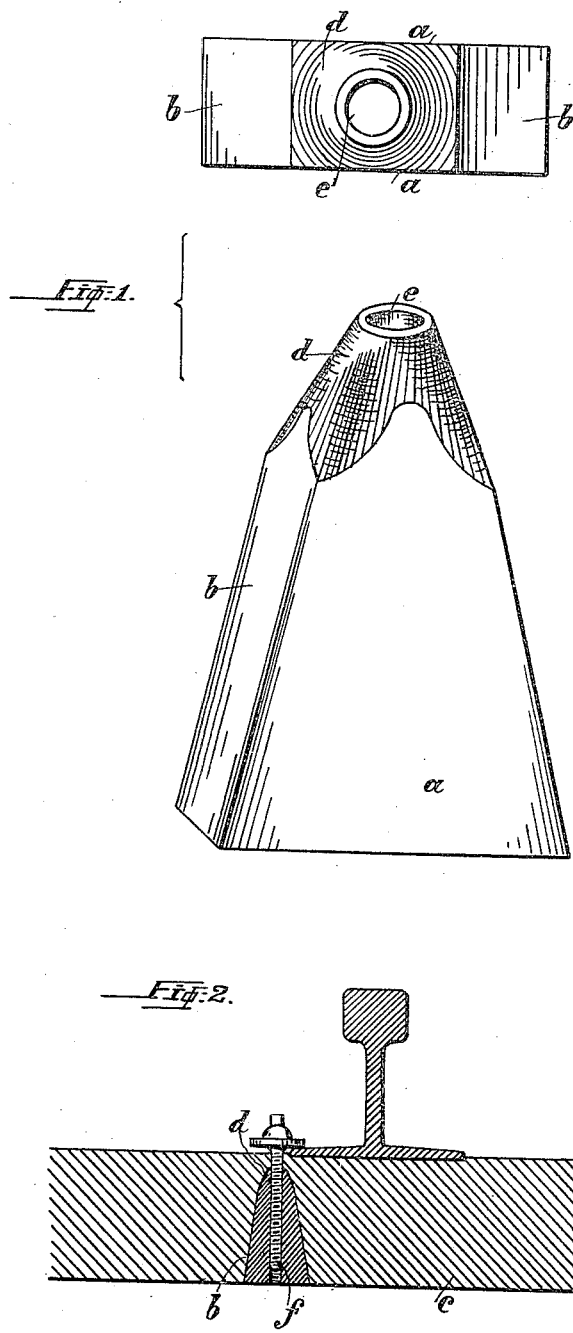

UNITED STATES PATENT OFFICE.

WILHELM WILKENS, OF BRUNSWICK, GERMANY.

RAIL-SUPPORT.

951,928. Specification of Letters Patent. Patented Mar. 15, 1910.

Application filed November 26, 1909. Serial No. 529,924.

*To all whom it may concern:*

Be it known that I, WILHELM WILKENS, a subject of the Regent of Brunswick, and residing at Brunswick, in Germany, have invented certain new and useful Improvements in Rail-Supports, of which the following is a full, clear, and exact description.

It has been attempted to use as a support for rails, in place of the expensive oak sleepers and as a substitute for pressed steel plate sleepers which proved unsatisfactory, sleepers of soft wood, which, on being properly impregnated with anti-rotting substances, proved to be sufficiently durable, but still unsatisfactory owing to the fixing screws failing to obtain sufficient hold in the soft wood.

The object of the present invention is to render the soft wood sleepers suitable, by providing them with hard wood dowel pins of special shape, into which the rail fixing screws may be screwed.

A construction according to this invention is illustrated by way of example in the accompanying drawing in which—

Figure 1 shows the dowel pin in plan and side elevation, while Fig. 2 is a longitudinal section through the sleeper with the dowel pin inserted.

The dowel pin has a rectangular base, and the wide sides *a* of the dowel pin are parallel to each other, while its narrow sides *b* converge or form a sharp angle with each other upward. The dowel pin has therefore wedge-like arranged narrow sides, so that the tapered or slot-like hole for the insertion of the dowel pin into the wooden sleepers, weakens the latter only to a slight extent. The parallel wide sides or faces which are placed in the direction of the fibers of the sleeper *c*, enable therefore the dowel pin to be firmly forced in without the sleeper splitting. At the point *d* the dowel pin is turned to the shape of a cone, and the bore *e* for the rail fixing screw *f* passes vertically through the center of the dowel pin.

In practical use the dowel pin is introduced from below into the corresponding opening of the sleeper in such manner that the wide side of the pyramid shaped dowel pin body is in the direction of the wood fibers of the sleeper. When a rail fixing screw is screwed from the top into the dowel pin, the foot of the rail will be pressed on the sleeper after the screw has been screwed down to a sufficient extent, and at the same time the dowel pin drawn in from below into the sleeper so that it is firmly fixed. The more the rail fixing screw is tightened, the firmer the dowel pin will be drawn into the sleeper. The cone turned at the upper end of the dowel pin, brings about a completely tight joint at the point of the dowel pin in the sleeper, so that no moisture can get in from the top. This is of special importance, as the wedge-shaped lateral walls of the dowel pin are able to produce a tight closing, but the parallel sides have no special jamming action.

What I claim as my invention and desire to secure by Letters Patent is:—

1. A rail support comprising a soft wood sleeper having slots therein, and hard wood dowel pins inserted in said slots, said pins having two wide and parallel faces, and two narrow and converging faces, and the slots in said sleeper being so formed that when the pins are introduced therein, the wide faces lie parallel to the direction of the fibers of the wood.

2. A rail support comprising a soft wood sleeper having slots therein, and hard wood dowel pins inserted in said slots and fixing screws attached to said pins said pins having two wide and parallel faces, and two narrow and converging faces, and the slots in said sleeper being so formed that when the pins are introduced therein, the wide faces lie parallel to the direction of the fibers of the wood.

3. A rail support comprising a soft wood sleeper having slots therein, and hard wood dowel pins inserted in said slots, said pins having two wide and parallel faces, and two narrow and converging faces, and having their smaller ends turned cone shaped, and the slots in said sleeper being so formed that when the pins are introduced therein, the wide faces lie parallel to the direction of the fibers of the wood.

In testimony whereof I have signed my name to this specification in the presence of two subscribing witnesses.

WILHELM WILKENS.

Witnesses:
  JULIUS SECKEL,
  GEORG KING.